(12) United States Patent
Lan

(10) Patent No.: US 7,575,208 B2
(45) Date of Patent: Aug. 18, 2009

(54) HOLDING DEVICE WITH A SECURING SHEET FOR MOUNTING ONTO A WALL

(76) Inventor: Yung-Huei Lan, 1061 Wallace Dr., San Jose, CA (US) 95120

( * ) Notice: Subject to any disclaimer, the term of this patent is extended or adjusted under 35 U.S.C. 154(b) by 472 days.

(21) Appl. No.: 11/200,825

(22) Filed: Aug. 9, 2005

(65) Prior Publication Data

US 2006/0022100 A1    Feb. 2, 2006

Related U.S. Application Data

(63) Continuation-in-part of application No. 10/380,023, filed on Oct. 27, 2003, now abandoned.

(51) Int. Cl.
*A47G 1/17* (2006.01)
*A47G 29/00* (2006.01)
*F16B 47/00* (2006.01)

(52) U.S. Cl. .............. 248/205.3; 248/205.4; 248/205.5; 248/205.6; 248/205.7; 248/205.8; 248/206.1; 248/206.2; 248/364; 248/683; 428/99; 428/119; 428/120

(58) Field of Classification Search .............. 248/205.3, 248/205.4, 205.5, 205.6, 205.7, 205.8, 206.1, 248/206.2, 364, 683; 428/99, 119, 120
See application file for complete search history.

(56) References Cited

U.S. PATENT DOCUMENTS 5,014,946 A * 5/1991 Gruber ..................... 248/206.5
5,318,262 A * 6/1994 Adams .................... 248/205.8
6,669,033 B1 * 12/2003 Lian ......................... 211/87.01

* cited by examiner

*Primary Examiner*—Anita M. King
*Assistant Examiner*—Nkeisha J Dumas
(74) *Attorney, Agent, or Firm*—Charles E. Baxley

(57) ABSTRACT

A holding device with a securing sheet for mounting onto a wall. The device comprises a base means and a holding means connected with said base means for supporting a foreign article. An impervious securing sheet is connectable airtightly onto the wall and extends outwardly beyond a backside of the base means. A friction plate is connected to the base means and the securing sheet. If the friction plate and the securing sheet pull away from the wall, a negative pressure prevents the article from falling.

12 Claims, 14 Drawing Sheets

HOLDING DEVICE WITH A SECURING SHEET FOR MOUNTING ONTO A WALL

CROSS REFERENCE

The present Application is a continuation application based on U.S. patent application Ser. No. 10/380,023 that had been filed on Oct. 27, 2003 now abandoned.

FIELD OF THE INVENTION

The present invention relates to a holding device, more particularly, to a holding device for mounting onto a wall.

PRIOR ART

A holding device for mounting onto a wall is mounted onto the wall surface for holding or hanging articles, such as a coat and hat, a soap holder, a bathroom towel rack and the like. The known holding devices for mounting onto a wall generally comprise a base and a holder connected with said base, wherein said holder is appropriately shaped for holding or hanging articles. In order to hold articles securely without damage and influence to the surface of the wall, the base of the holding device has to be securely and durably attached to a wall. In the prior art, the base means are fixed onto a wall by nails hammered into the wall, or by a suction cup generating negative pressure and sucking onto the wall, or by a double-side adhesive or hot-melt adhesive and the like. However, if the base is fixed by nails, the wall surface would be damaged easily; if the base is fixed by a suction cup, the adhesive force and duration is not satisfactory due to the limitation of the sucking area and the air tightness of the suction cup; if the base means is fixed by double-side adhesive or hot-melt adhesive, the fastness is not satisfactory either due to the limitation of the adhesive force. A kind of holding device with a securing sheet is disclosed in the U.S. Pat. No. 5,275,367 in which a PVC securing sheet with a large area provided under a base is attached to a wall. Since the contacting area between the device and the wall is increased, the adhesive force is increased. Another kind of holding device a securing sheet is disclosed in the U.S. Pat. No. 4,842,912 in which the holding device is also attached to a wall through a securing sheet with large area, wherein the securing sheet includes an interlayer and the base is disposed between the interlayer and the securing sheet. However, because the area and therefore the strength of the securing sheet is limited, the bearing capacity of the holding device is greatly restricted due to the limitation of the adhesive force.

SUMMARY OF THE INVENTION

It is an object of the present invention to overcome the disadvantages of the prior art and to provide a holding device with a securing sheet for mounting onto a wall which has an improved bearing capacity.

It is found that, in order to prevent the article hung on the holder from falling down, an upward force equal to the weight of the article has to be provided. The air pressure provides a horizontal force, i.e. a normal force which is necessary for generating a friction force and presses the base and the underlying securing sheet towards the wall, so that a static upward friction force is generated between the wall and the securing sheet. This upward force to prevent the article from falling down is provided by the adhesive and the friction force if the securing sheet has adhesive on its back side, as long as the maximal static friction force is not less than the weight of the article, falling of the article can be prevented. According to the analysis of the forces acting on the device, the friction effect can be improved and the friction force can be increased if friction plates are provided near (at the left side, right side, upper side and lower side of) the plate-shape base.

In order to achieve the above object, the present invention provides a holding device with a securing sheet for mounting onto a wall, comprising a base; a holding means for supporting foreign articles, said holding means is connected with said base; a securing sheet of good air-tight, which can be tightly secured onto a wall at its back side and is connected to said base at its front side, and said securing sheet extends beyond the boundary of said base; at least one friction plate, which is connected with said base by a connecting means such that said friction plate presses against the wall and an upwardly statistic friction force is generated.

Said friction plate may be located beyond the border of said securing sheet and presses directly onto the wall surface.

In addition, an air barrier layer may be provided on the surface of said securing sheet, or an air barrier layer may be provided between said base and said securing sheet.

In this invention, the most important function of the securing sheet is to provide air-tightness. The securing sheet may be made of paper and film with adhesive or fluid solid (viscous or gelatiniform) filling substance on its back side. Alternatively, the securing sheet may be made of electrostatic paster having a highly smooth surface with no adhesive on its back side. The electrostatic paster can be used for smooth wall surfaces, such as glass, ceramic tile, plastic and baking finish surfaces; the securing sheet with adhesive on its back can be used for the general wall surface; while the securing sheet with fluid solid filling substance on its back side can be used for the rough surface so that the filling substance can fill in the depression on the surface and the securing sheet can be tightly mounted on the wall.

In use, the securing sheet is attached onto a wall, and it comes into tight contact with the wall with excellent air-tightness by the adhesive on its back or by the attaching force generated on its surface. When the holder bears an article, the force applied to the base causes the securing sheet to be detached from the wall and generates a negative pressure in the gap therebetween. Under the air pressure, the base and the securing sheet are pressed against the wall so that the holding device can be attached on the wall securely and durably.

In holding device with a securing sheet according to the present invention, with at least one friction plate connected with the base provided, when the holder connected to the base bears an article, because the base connected with the friction plates is movable, in the case that the base and the securing sheet connected therewith have a tendency to depart from the wall under the force applied to the base, the friction plate will press against the wall and an upwardly statistic friction force is generated, so that the base can be prevented from falling down. Therefore, the attaching force between the holding device and the wall can be enhanced and the bearing capacity of the holding device is improved.

DETAILED DESCRIPTION OF THE PREFERRED EMBODIMENTS

In the first embodiment of the present invention, two friction plates are connected with the base means through the movable joints and are attached on the front surface of the securing sheet.

The above joints may be a bendable hinge or an appropriate cam structure. When the cam structure is used as the joint, it can cause the base means and the friction plate to move horizontally with respect to each other when the base means moves towards the friction plate in the vertical direction, so that the base means and the securing sheet connected with the base means are lifted up and separated from the wall surface, while the friction plate is maintained to be tightly attached to the wall. The cam may be of a slope structure or a diagonally upward pushing mechanism or the like.

The cam should be provided at the middle of the interface between the base means and the friction plate, so that when the cam acts, the force applied by it is focused on the center position; as a result, the middle portion of the base means adjacent to the friction plate uplifts higher from the wall, while the edge portion remains relatively closer to the wall, so that the securing sheet at the edge portion of the base means is only slightly pulled upwards and has less possibility to get ruptured.

In order to be better attached to the curved surface, the base means can be divided into a plurality of sub-base means which are connected with one another by movable joints.

Figure 1:
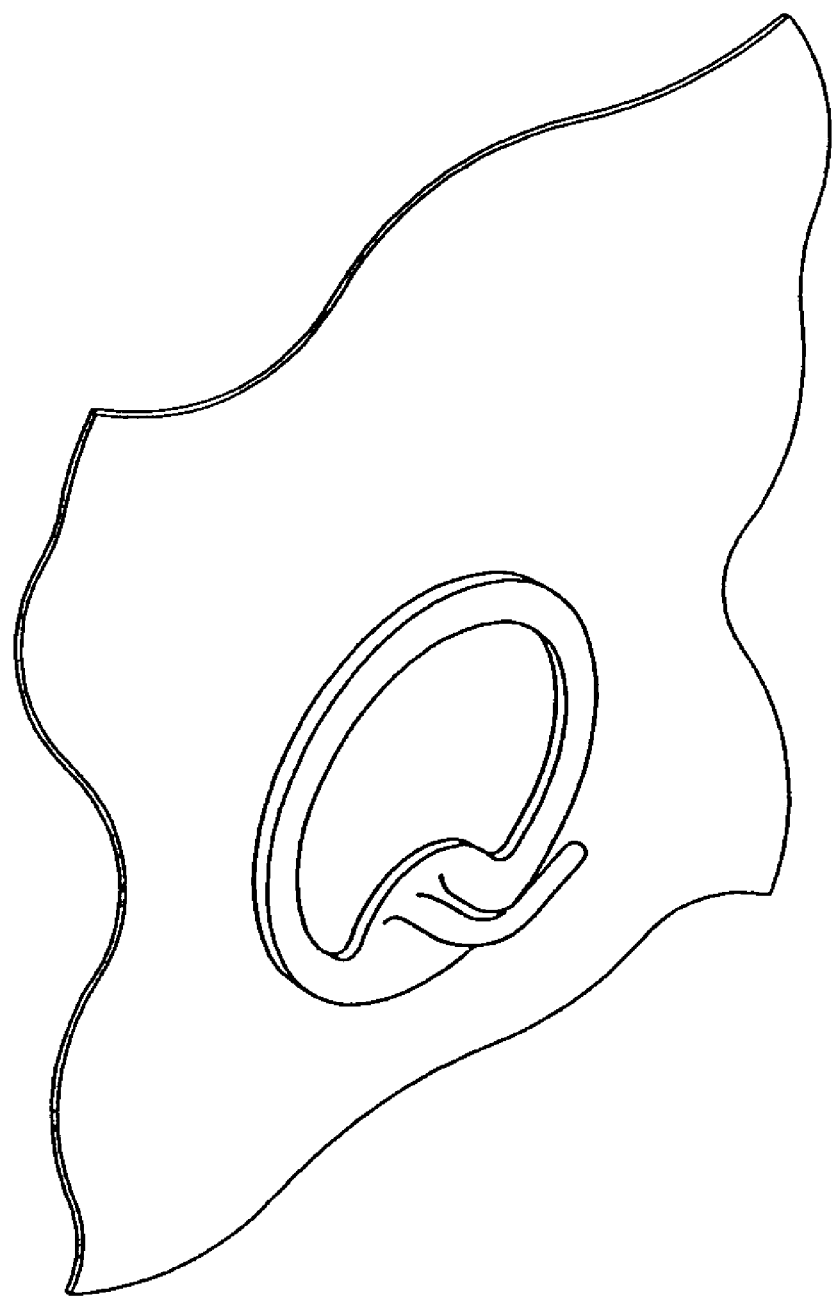
FIG. 1 is a schematic view showing a kind of holding device with a securing sheet invented by the applicant of this invention.
Figure 2:
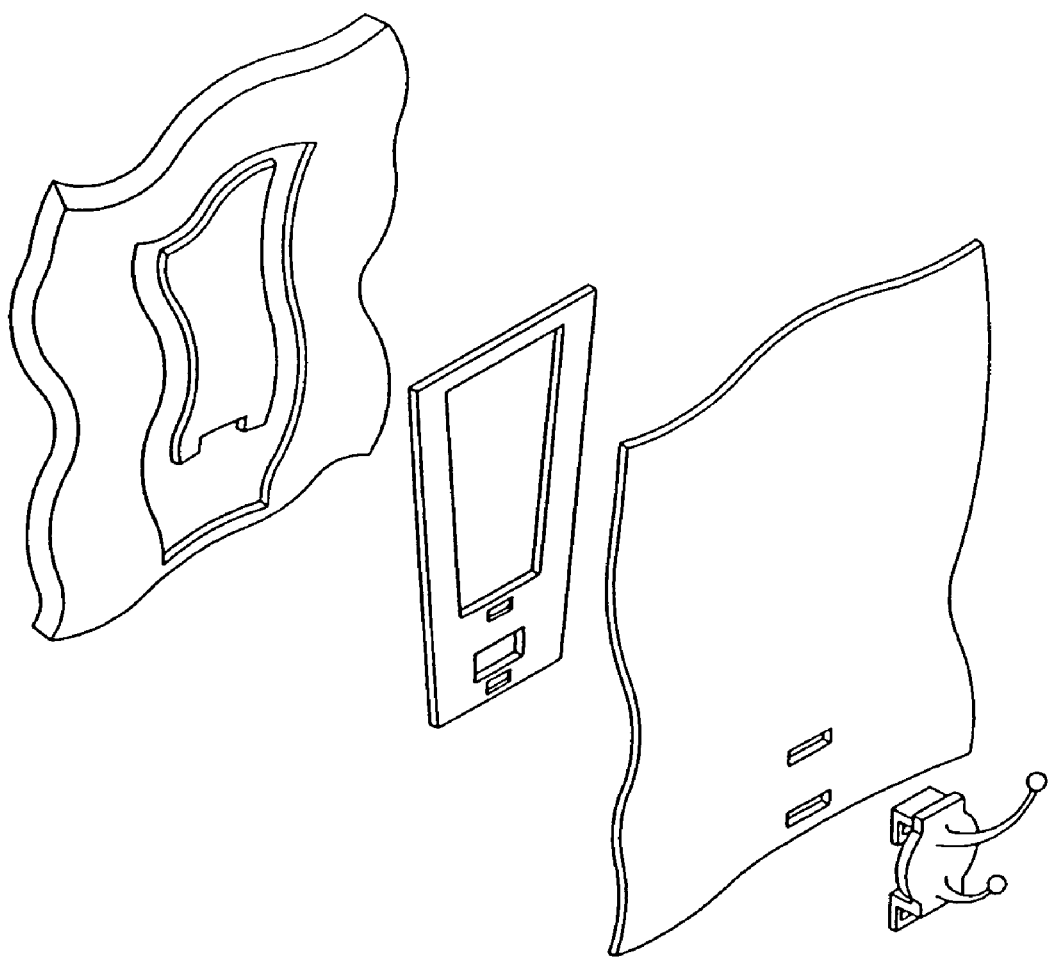
FIG. 2 is a schematic view showing another kind of holding device with a securing sheet invented by the applicant of this invention.
Figure 3:
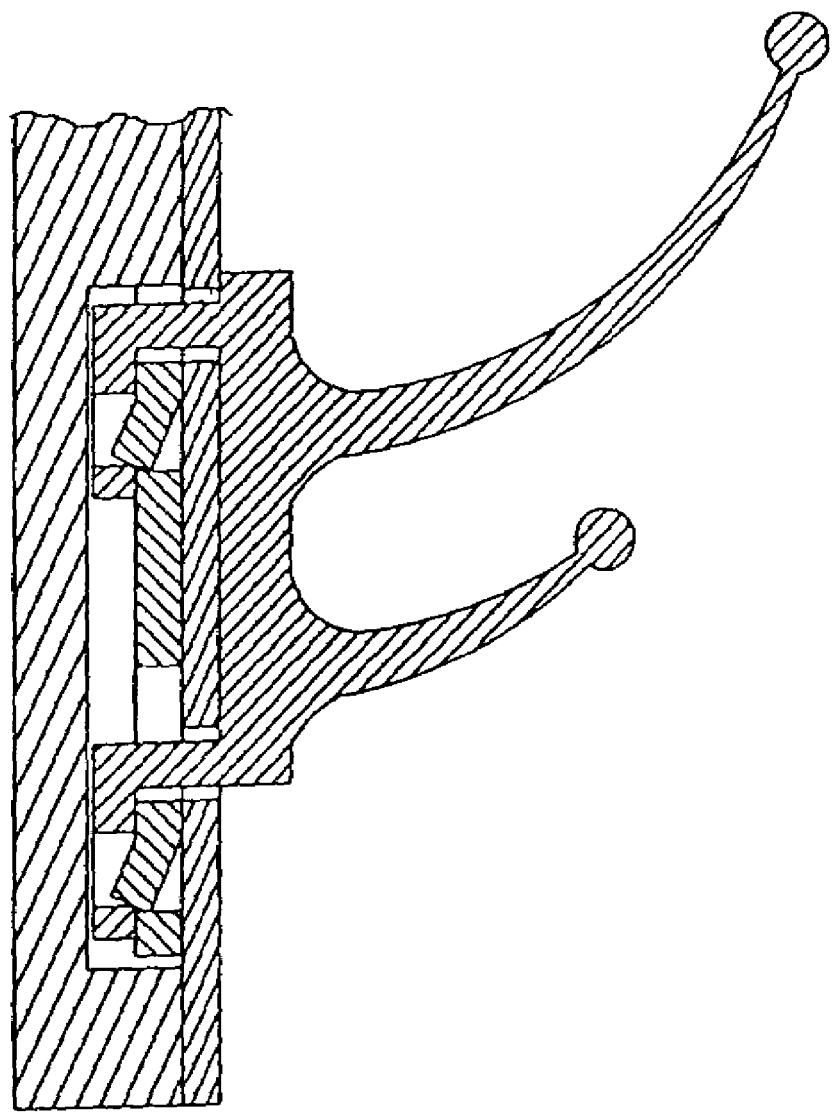
FIG. 3 is a sectional view showing the lower portion of the holding device shown in FIG. 2 when it is assembled.
Figure 4:
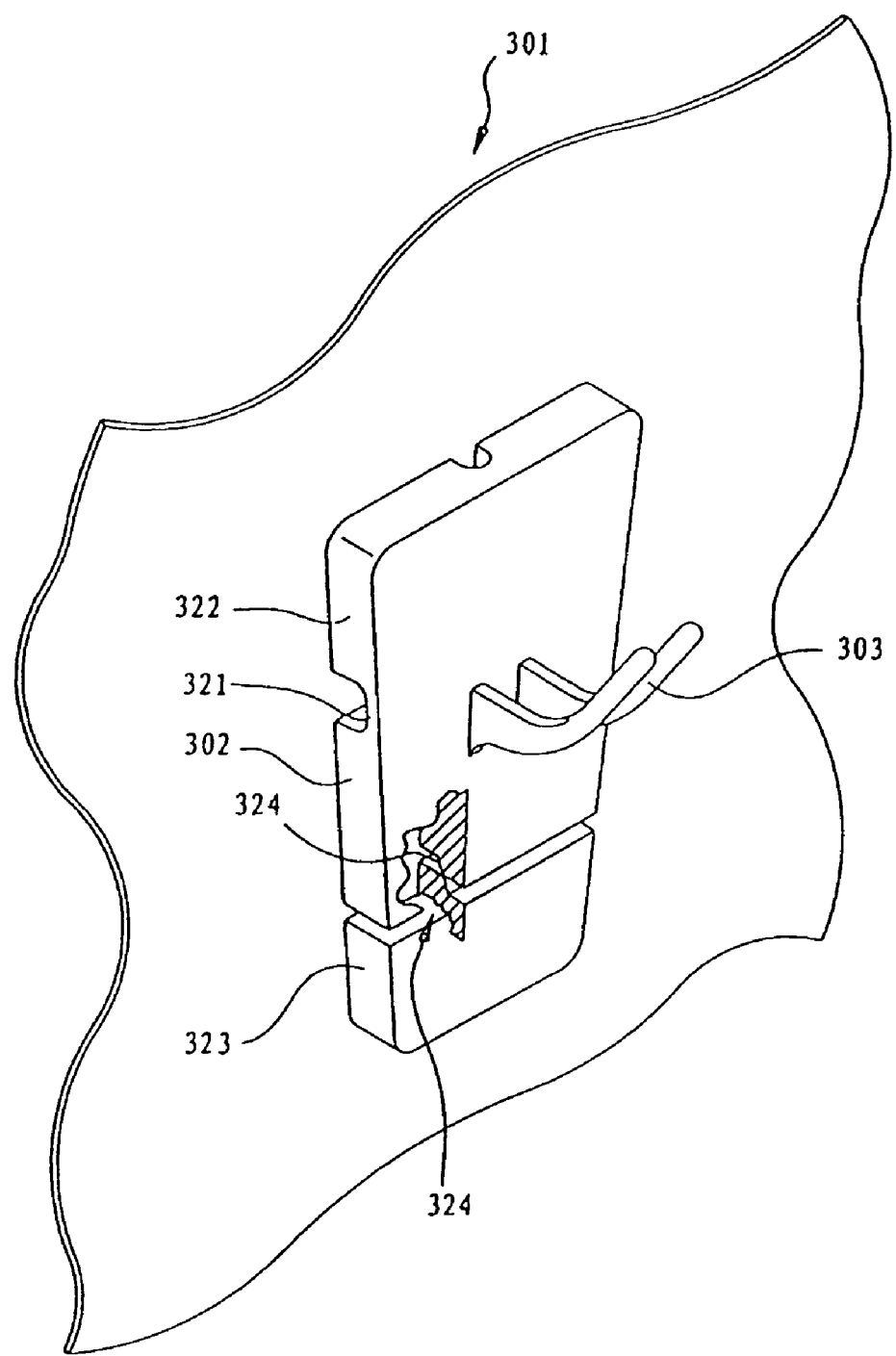
FIG. 4 is a perspective view with a partial section showing the holding device with a securing sheet for mounting onto a wall according to the first embodiment of the present invention.
Figure 5:
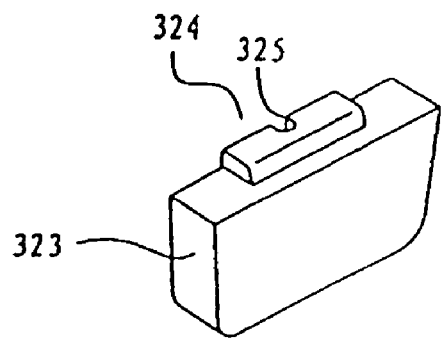
FIG. 5 is a schematic view showing the back side of the lower friction plate of the holding device shown in FIG. 4.
Figure 6:
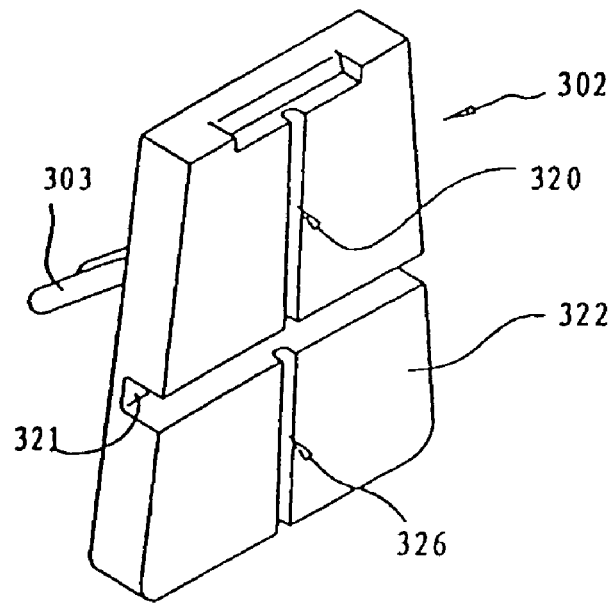
FIG. 6 is an inverse schematic view showing the back side of the base means and the upper friction plate of the holding device shown in FIG. 4.

In the first embodiment of the present invention, as shown in the FIGS. 4-6, a holding device with a securing sheet for mounting onto a wall includes a securing sheet 301, a base means 302 and a holder 303. The securing sheet 301 is an electrostatic paster of a square shape. The base means 302 in the shape of a plate is stuck on the front side of the securing sheet 301. The holder 303 embodies as two side by side hooks which are adjacent to each other and are connected to the base means 302. The base means 302 is provided with an upper friction plate 322 and a lower friction plate 323 respectively attached to the front side of the securing sheet 301 on its upper portion and its lower portion. The upper friction plate 322 is connected with the base means 302 through a hinge 321 and the lower friction plate 323 is connected with the base means via a slope-shaped cam structure 324. Moreover, the base means 302, the upper friction plate 322 and the lower friction plate 323, are provided with hinges 320, 326 and 325 formed by longitudinal grooves, so that the base means 302, the upper and lower friction plates can be bent easily, and can smoothly fit to the curved wall surface.

Figure 7:
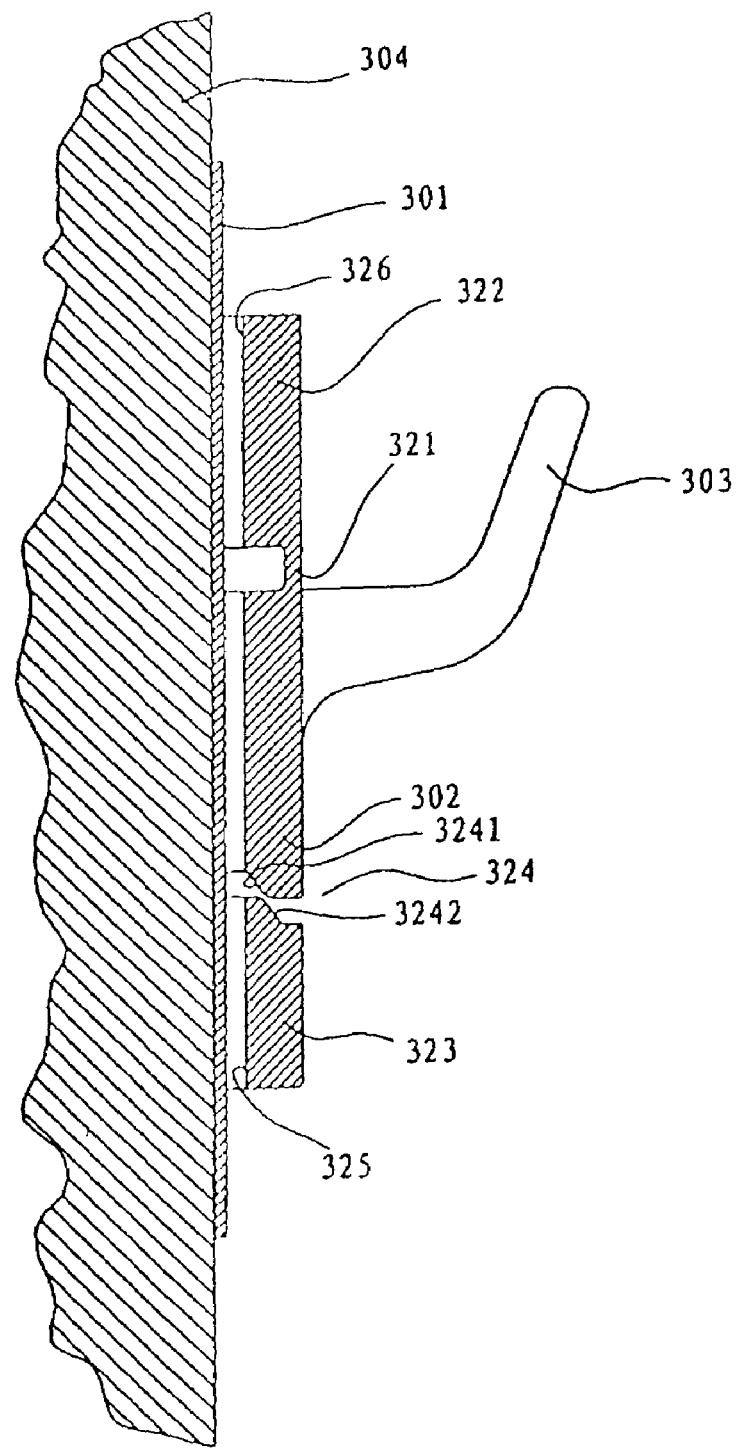
FIG. 7 is a sectional view showing the holding device shown in FIG. 4.
Figure 8:
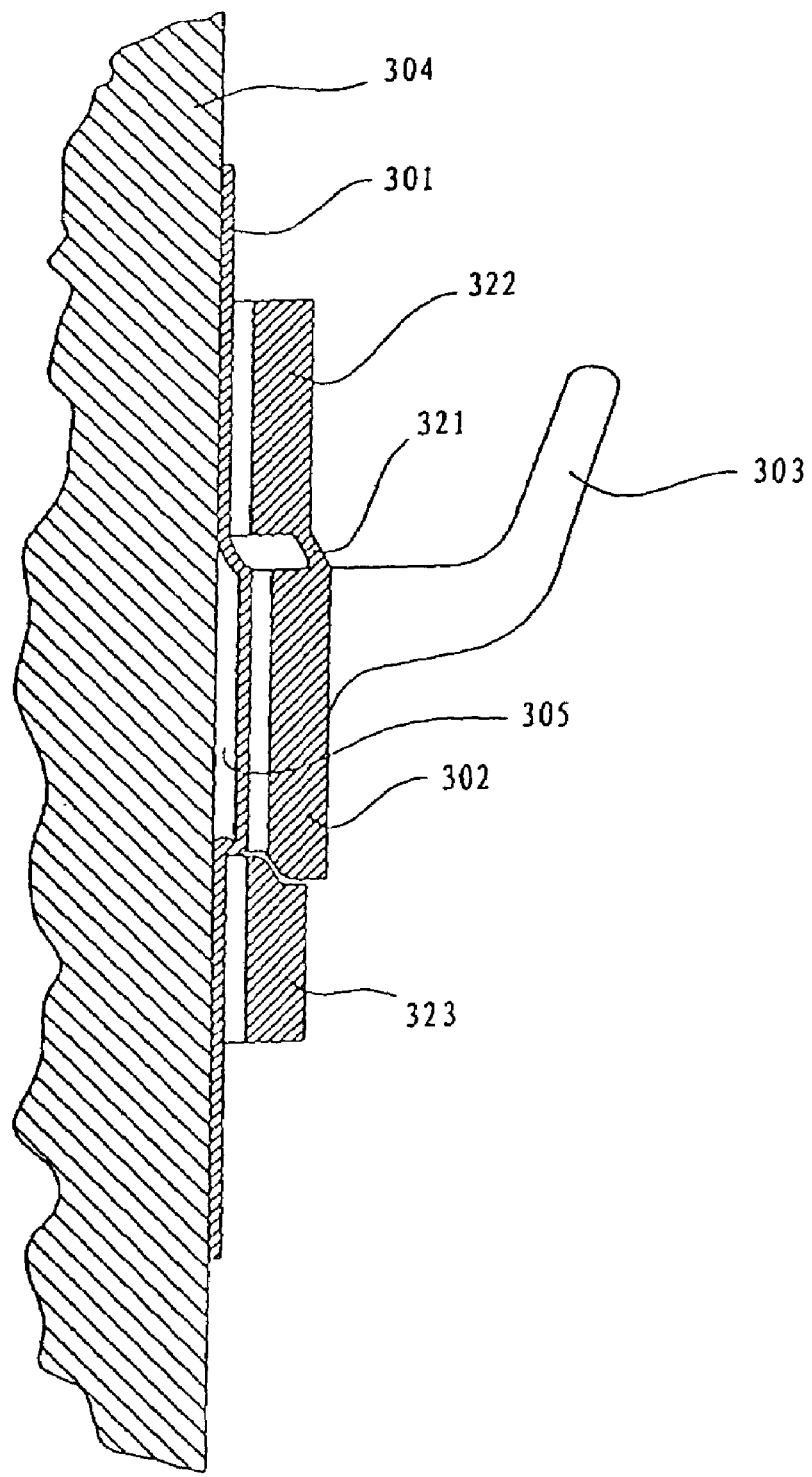
FIG. 8 is a schematic view showing the holding device shown in FIG. 7 when it is subject to an external force.
Figure 9:
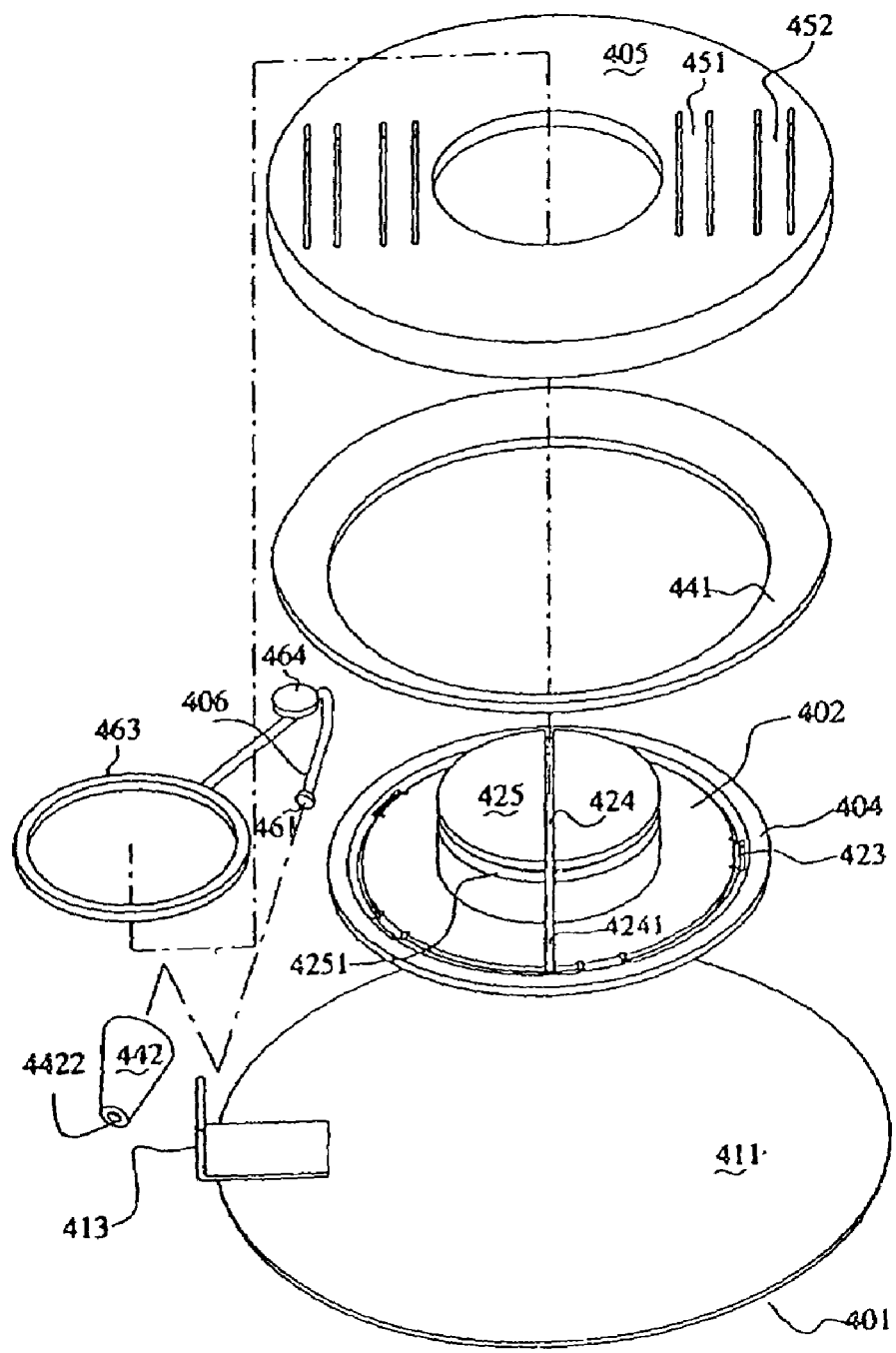
FIG. 9 is an exploded view showing the holding device with a securing sheet for mounting onto a wall according to the second embodiment of the present invention.
Figure 10:
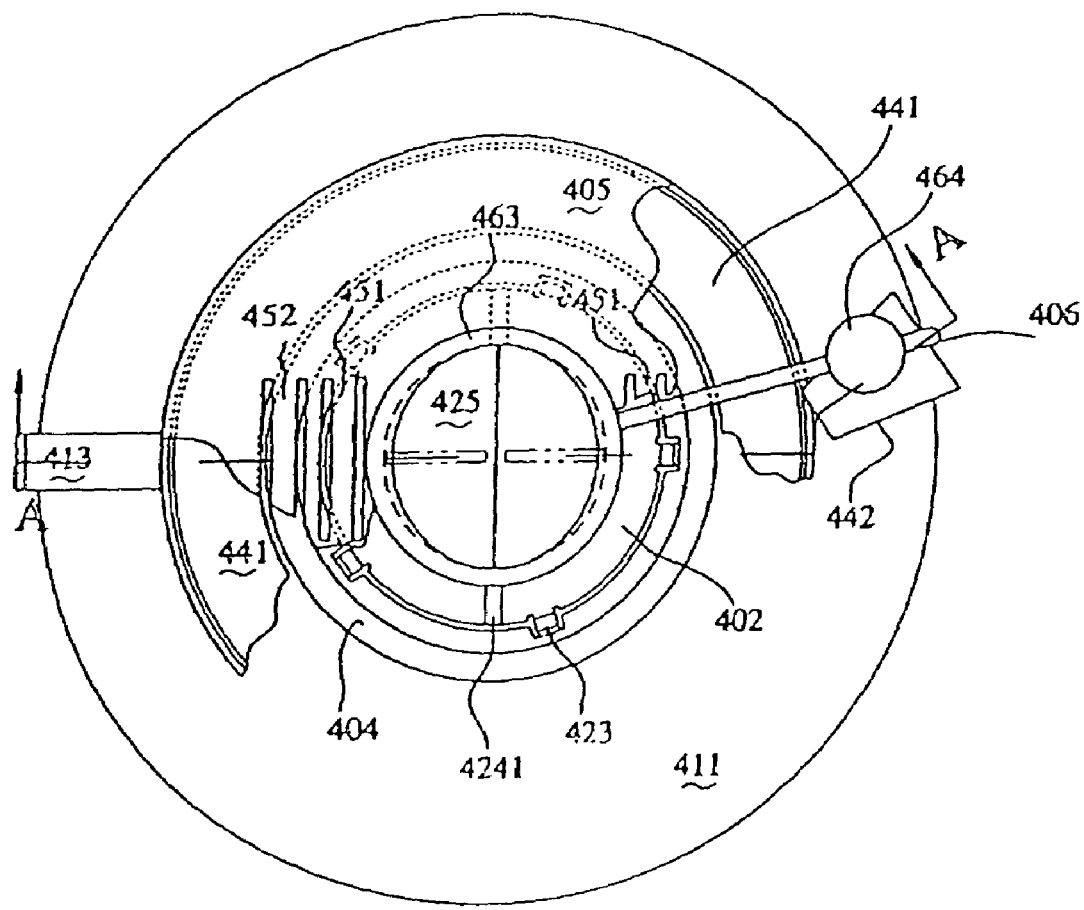
FIG. 10 is a schematic view with a partial section showing the structure of the holding device shown in FIG. 9 when it is assembled.

When the holder 303 bears no load, as shown in the FIG. 7, the base means 302 is evenly attached to the wall surface, and the upper slope 3241 has not yet contacted with the lower slope 3242 of the cam structure 324. As shown in FIG. 8, when a force is applied to the hook 303, the base means 302 moves downwards, the upper slope 3241 slides onto the lower slope 3242 along the slope, so that the base means 302 and the securing sheet 301 connected to the base means 302 are detached from the wall 304. A clockwise torque as shown in the FIG. 8 is generated due to the force applied to the holder 303, and the torque causes the upper portion of the base means 302 and the securing sheet 301 attached to the base means 302 to be detached from the wall 304. As a result, the securing sheet 301 is pulled outwards by a little due to its elasticity, so that negative pressure is generated in the clearance 305 between the securing sheet 301 and the wall 304, at the same time, negative pressure is also generated between the wall 304 and the portions of the securing sheet 301 beneath the upper friction plate 322 and beneath the lower friction plate 323. Consequently, the air pressure presses the friction plates and the securing sheet 301 beneath the friction plates against the wall 304. Thus, the resultant static friction force between the securing sheet 301 and the wall 304 produces an effect preventing the securing sheet 301 from sliding downwards so as to prevent the base means 302 from falling.

A pressing roller for excluding the air between the securing sheet and the wall can further be provided in the present invention in order to keep well air tightness between the securing sheet and the wall.

Figure 11:
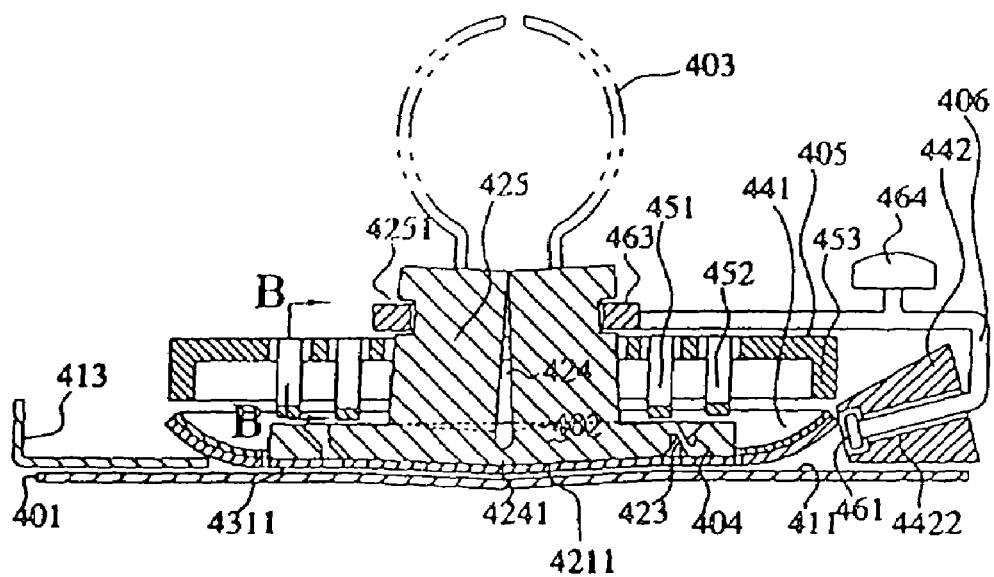
FIG. 11 is a sectional view along the line A-A of FIG. 10.
Figure 12:
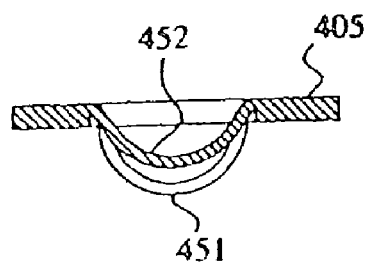
FIG. 12 is a sectional view along the line B-B of FIG. 11.

In the second embodiment of the present invention, as shown in the FIGS. 9-12, a holding devise with a securing sheet for mounting onto a wall includes a securing sheet 401, a base means 402, a friction plate 404, a rolling ring 441, a pressing roller 442, a pressing plate 405, a stripping piece 413 and a holder 403 (only shown the FIG. 11). The securing sheet 401 is of circular shape, the front surface 411 of which is stuck on the back surface of the base means 402 pressing against the wall and is stuck on the back surface of the friction plate 404 pressing against the wall. An adhesive is provided on the back surface of the securing sheet 401 so that the securing sheet can be stuck on the wall. The base means 402 is a circular plate provided with ligaments 423 on the periphery thereof, said ligaments 423 are connected with the circular shaped friction plate 404. On the periphery of the base means 402 is provided with a slope structure mating with a corresponding slope structure on the inner periphery of the friction plate 401. When the base means 402 moves outwards in any direction and meets with the friction plate 404, the slope structure of the base means 402 rides on the corresponding slope structure of the friction plate 404 and thus the base means 402 is pushed up and detached from the wall, so that the securing sheet 401 attached to the base means 402 follows the latter to depart from the wall. Thus a clearance of negative pressure is generated between the securing sheet 401 and the wall, and a negative pressure is also produced between the wall and the securing sheet 401 beneath and adjacent to the friction plate 404. As a result, the air pressure presses the friction plate 404 against the wall, so that the securing sheet 401 beneath the friction plate 404 is tightly and securely pressed on the wall with the help or the resultant friction force.

The base means 402 is provided along its center line with a groove 424 having a hinge 4241 on its bottom. As shown in the FIG. 11, the back side of the base means 402, i.e. the attaching surface 4211, is formed bulging towards the wall (downwards), so that the upper ends of the groove 424 close to each other when no force is applied thereto. As a result, when the base means 402 is pressed and attached onto the wall, the center portion of the base means 402 contacts with the wall first, so that the air between the securing sheet 401 and the wall is excluded outwards from the center portion.

In order to make the back surface of the base means 402 into a curved surface with its center portion bulging outwards, as an alternative form to the above hinge structure, the attaching surface 4211 may be formed into a spherical surface bulging outwards, provided thereon with elastic material and a hollow cavity, so that the attaching surface 4211 can be pressed outwards from its center portion.

Since it will take long distance for the air to penetrate beneath the friction plate from the margin of the securing sheet around the friction plate 404, pressing the securing sheet tightly on the wall can effectively improve the airtightness.

In order to make the securing sheet around the friction plate 404 to tightly attach to the wall, provided around the friction plate 404 is the rolling ring 441, which has a ring shape with its inner periphery bulging towards the securing sheet 401 and which may be made of elastic material such as resilient steel sheet. When the rolling ring 441 is pressed onto the wall, the inner portion of the rolling ring 441 firstly presses the securing sheet 401 against the wall, and the continuous pushing of the rolling ring 441 will cause the inner periphery of the rolling ring 441 to be bent upwards and the entire rolling ring 441 gradually bulges to the reverse side, so that the securing sheet 401 is continuously rolled outwards from its center portion by the rolling ring 441 and the air is excluded, thereby the securing sheet 401 is pressed tightly on the wall.

The pressing plate 405 is disposed above the rolling ring 441 and is provided with two long springs having the shape of an arched plate which can be used to push the base means 402 and two short springs which can be used to push the friction plate 404. The pressing plate 405 has circular ring shaped pressing foot 453 at its periphery for pushing the outer periphery of the rolling ring 441. Thus, as long as the pressing plate 405 is pushed, the long springs 451 firstly presses the base means 402 against the wall, then, the short springs 452 presses the friction plate 404 against the wall, next, the pressing foot 453 pushes the rolling ring 441, so that the air between the securing sheet 401 and the wall is continuously squeezed out from the center to the outside of the securing sheet 401.

Since the wall surface may be uneven, the back surfaces of the base means 402, of the friction plate 404 and of the rolling ring may be covered with soft cushion 4311, so that the securing sheet 401 can be evenly pressed onto the wall.

Since the outer periphery of the securing sheet 401 may extend to a large region, to press the whole region of the securing sheet 401, the rolling ring 441 has to be big, therefore, a pressing roller 442 is further provided on the base means 402. The pressing roller 442 has the shape of a roller and is provided at the axis thereof with a shaft hole 4422 through which a shaft 406 is disposed. One end 461 of the shaft 406 is big enough to prevent the pressing roller 442 from detaching from the shaft 406 and the other end is bent and connected to a circular ring 463. The circular ring 463 is fit into a groove 4251 provided on the upwardly projecting cylindrical portion 425 of the base means 402, so that the pressing roller 442 can rotate around the base means 402. In order to facilitate the rolling of the pressing roller 442 on the circular path, the rolling body of the pressing roller 442 is formed into an appropriate taper. The pressing roller 442 can be pushed to rotate and pressed by griping a gripe 464 provided on the shaft 406. It can be seen from the FIG. 10 that the axis of the pressing roller 442 is inclined by an angle with respect to the radius of the base means 402. When the gripe 464 is griped and rotated clockwise, the portion of the securing sheet 401 which is closer to the center will be pressed earlier, while the portion of the securing sheet 401 which is farther from the center will be pressed later. Thus, the air between the securing sheet and the wall can be squeezed out from the center to the outside. The pressing roller 442 is provided with soft material on its rolling surface so that the securing sheet 401 can be evenly pressed onto the wall.

A stripping piece 413 extending upwards is also provided on the edge of the front surface 411 of the securing sheet. By pulling the stripping piece 413 upwards, the edge of the securing sheet can be pulled and detached from the wall and thus the whole holding device can be removed from the wall.

It has been proved by the test that the effect to prevent the holding device from sagging will be better if the friction plate is directly pressed against the wall, instead of attaching to the securing sheet.

Figure 13:
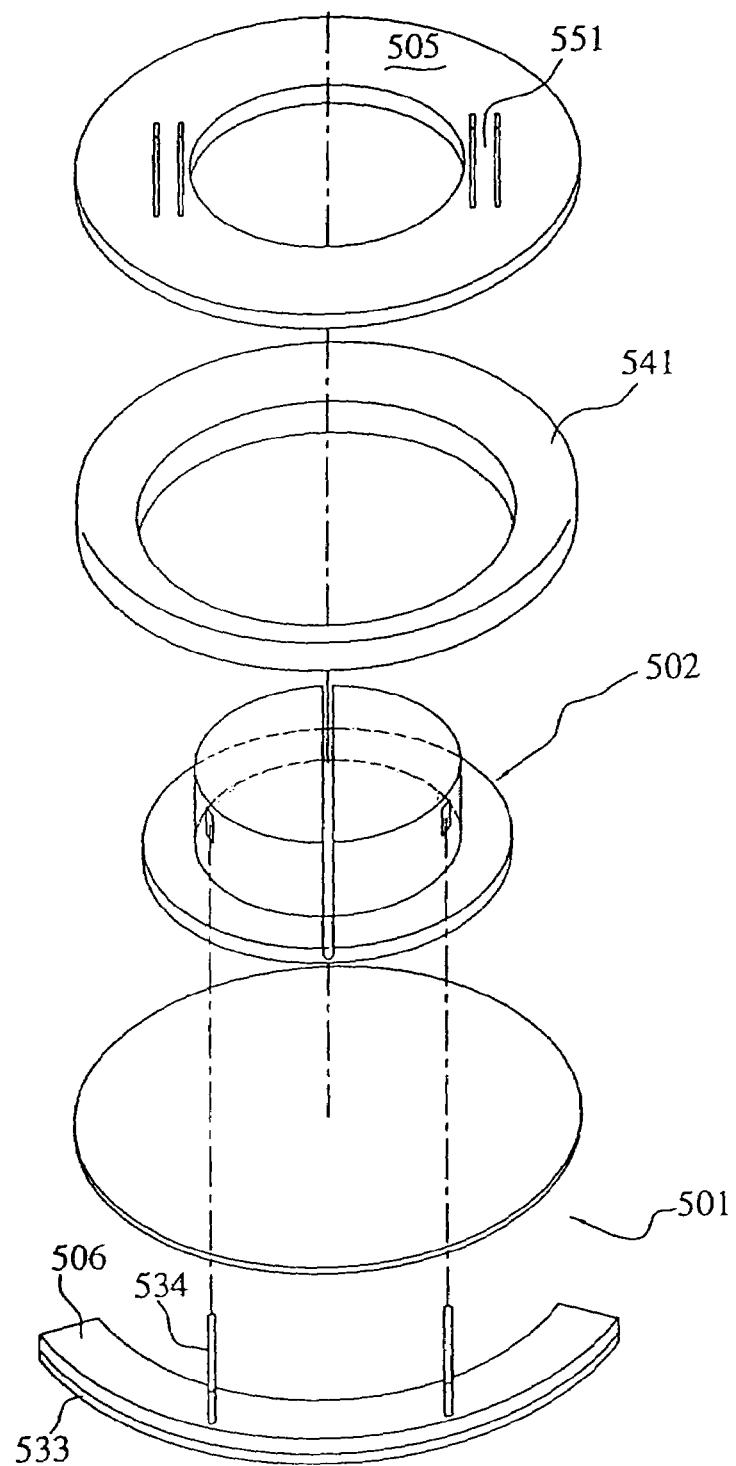
FIG. 13 is an exploded view showing the holding device with a securing sheet for mounting onto a wall according to the third embodiment of the present invention.
Figure 14:
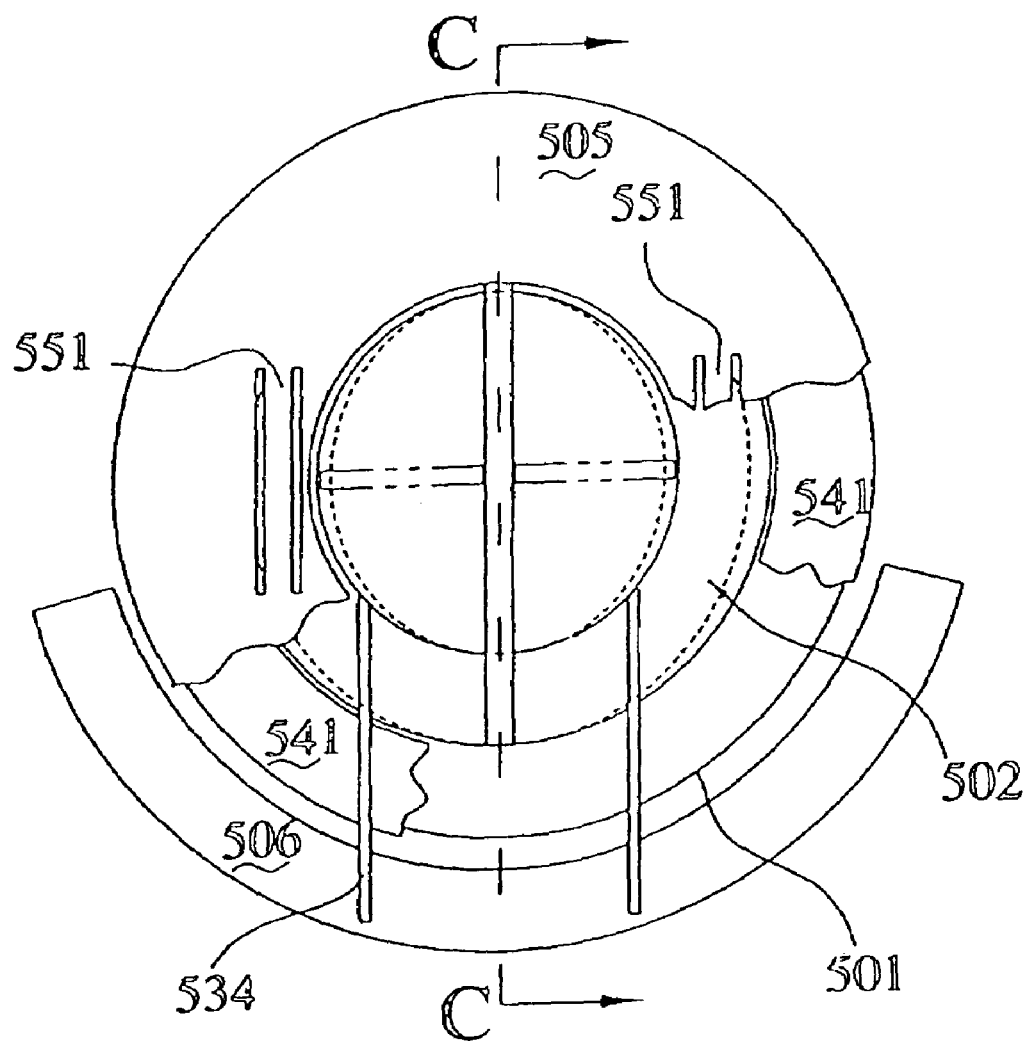
FIG. 14 is a schematic view with a partial section showing the structure of the holding device shown in FIG. 13 when it is assembled.
Figure 15:
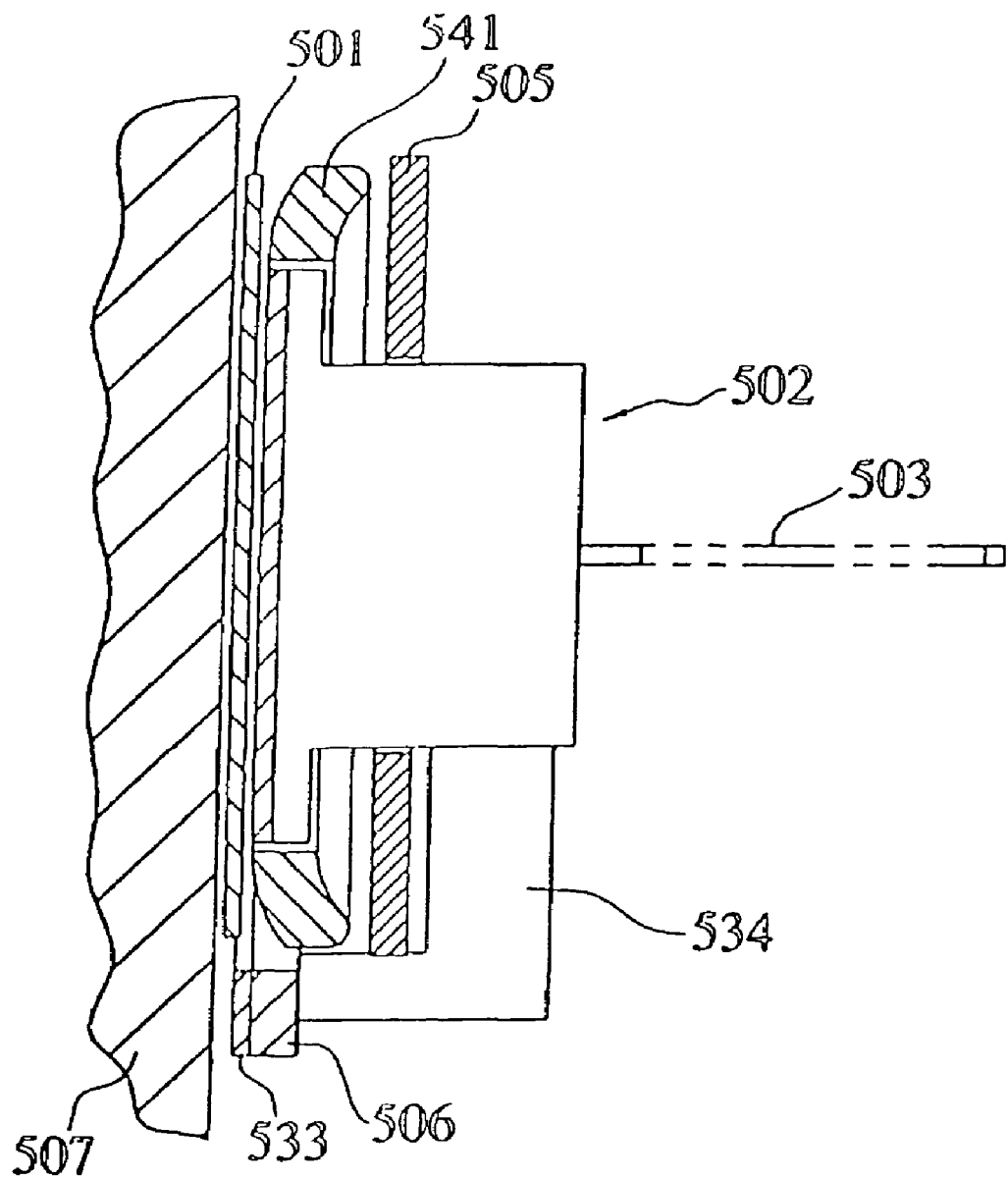
FIG. 15 is a sectional view along the line C-C of FIG. 14.

In the third embodiment cf the present invention, as shown in the FIGS. 13-15, a holding device with a securing sheet for mounting onto a wall includes a securing sheet 501, a base means 502, a friction plate 506, a rolling ring 541, a pressing plate 505 and a holder 503 (only shown in the FIG. 15). One difference between the third embodiment and the second embodiment is that, the friction plate 506 is connected with the base means 502 via detachable connecting rods 534 and directly presses against the wall 507 beyond the border of the securing sheet 501. Since some kinds of securing sheets tend to slide on the wall after they have been pressed for a long time, material with high friction coefficient 533 such as foamed rubber and cork is provided on the back surface of the friction plate 506. When assembling, the connecting rods 534 connected with the friction plate are inserted into the corresponding holes in the base means and connected with the base means, and the holding device may be attached onto the wall followed by assembling the friction plate on the base means; alternatively, the friction plate may be assembled followed by mounting the holding device onto the wall. The holder 503 may be connected to the base means 502 or to the connecting rods 534 of the friction plate 506.

The rolling ring 541 made of thick and soft materials has a ring shape with its inner periphery bulging towards the securing sheet 501, similar to the structure in the second embodiment. Since the rolling ring 541 is thick, the pressing plate 505 needs not to have pressing foot projecting downwards as that in the FIG. 11 and the short springs are no longer used. In assembling, the base means 502 is pressed onto the wall 507 by the pressing plate 505, first, the long spring 551 presses the base means 502 towards the wall, then, the rolling ring 541 is pushed by the pressing plate 505 to be deformed and to gradually contact and press the securing sheet 501 from the center portion to the outer periphery of the securing sheet 501. Thus, the air between the securing sheet 501 and the wall 507 is continuously squeezed out from the center to outside. After that, the friction plate 506 connected with the base means 502 by the connecting rods 534 are directly pressed against the wall 507.

It has been proved that the center portion of the securing sheet is easy to be penetrated by the molecules of the air due to the force applied on the base means, as a result, air penetrates in between the securing sheet and the wall through the base means and the securing sheet. Therefore, the air tightness of the center portion of the securing sheet should especially be enhanced. In order to achieve a desired air-tight effect, on one hand, the base means and the securing sheet can be made of materials with excellent air-tightness property, on the other hand, an air barrier layer may be provided on the surface of the center portion of the securing sheet and it may be metal foil or PVDC materials, and the like.

Figure 16:
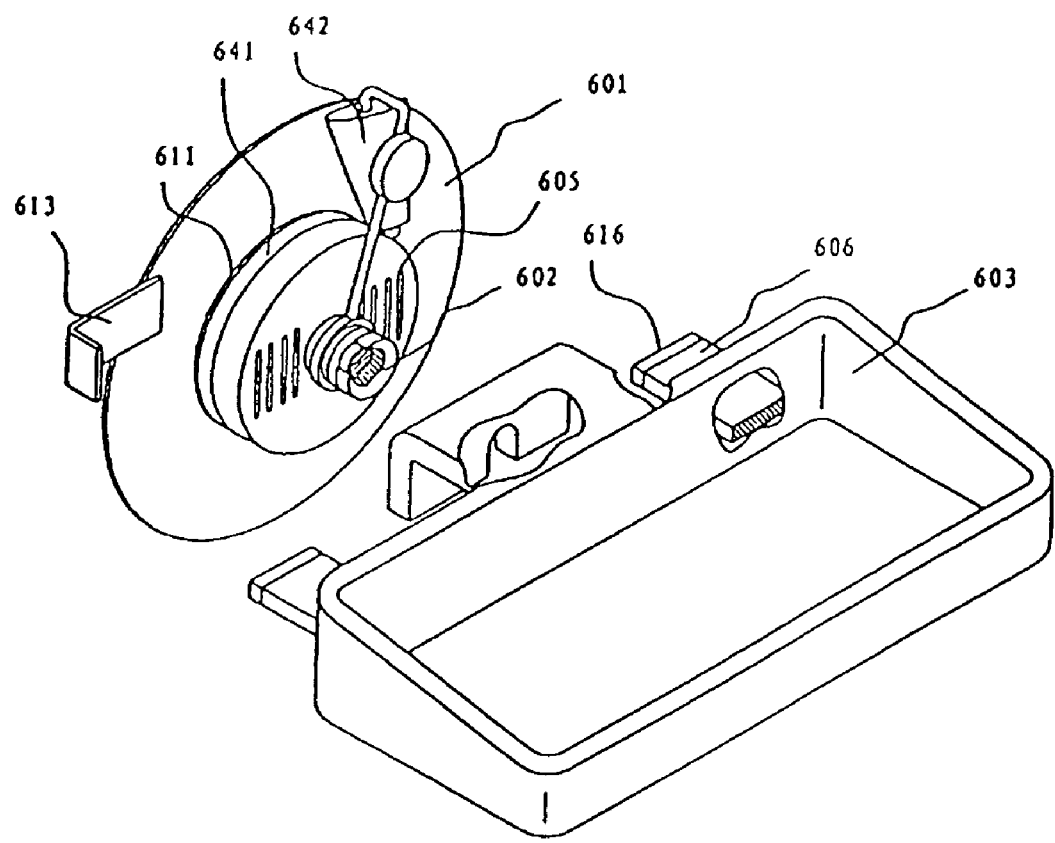
FIG. 16 is a schematic view showing the holding device with a securing sheet for mounting onto a wall according to the forth embodiment of the present invention.

In the forth embodiment of the present invention, as shown in FIG. 16, a holding device with a securing sheet for mounting onto a wall includes a securing sheet 601, a base means 602, a rolling ring 641, a pressing roller 642, a pressing plate 605, a stripping piece 613 and a holder 603. One difference between the forth embodiment and the second embodiment is that, a layer of aluminum foil 611 is stuck between the base means 602 and the securing sheet 601 and has an area slightly larger than that of the base means 602. Thus, better air-tightness can be achieved by way of the excellent gas barrier property of the aluminum foil layer. The holder 603 is in the shape of a basket and is supported on the base means 602. Two pieces of friction plates 606 are fixed to the basket shaped holder 603 on the side towards the wall. The two friction plates 606 are located under the securing sheet 601 and directly press against the wall surface. Each of the friction plates 606 is provided with a layer 616 of high frictional coefficient material on the side towards the wall. When a heavy article is placed inside the holder, a torque mechanism is formed, wherein the base means 602 acts as the fulcrum, the weight center of the heavy article is the point where external force is applied, and the friction plates 606 are the positions where reaction force is applied. The torque pulls and detaches the base means from the wall while it presses the friction plates onto the wall. The dimension of the friction plate can be so designed that the maximal static frictional force between the friction plate and the wall will be large enough to bear the weight of the article and the basket shaped holder. Thus, the friction plates bear all of the weight, while the base means only bears the force perpendicular to the wall. Therefore, the holding device with a securing sheet for mounting onto a wall according to the present invention can bear large load and can be fixed on the wall securely and durably.

What is claimed is:

1. A holding device with a securing sheet for mounting onto a wall, comprising:
   a) a base means in a shape of a circular plate and having a boundary;
   b) a holding means for supporting a foreign article, said holding means being connected with said base means;
   c) the securing sheet being air-tight, and having a back side and a front side; said securing sheet can be tightly secured onto a wall at said back side thereof and being connected to said base means at said front side thereof, and extending beyond said boundary of said base means;
   d) at least one friction plate in a shape of a ring located around said base means; said at least one friction plate being connected with said base means by ligaments provided on a periphery of said base means; said periphery of said base means and an inner periphery of said friction plate have inclined surfaces, respectively, which mate with each other, such that said friction plate presses against the wall and an upwardly statistic friction force is generated;
   wherein a rolling ring made of resilient material is provided around said base means, and an inner periphery of said rolling ring bulges towards said securing sheet.

2. The holding device with a securing sheet for mounting onto a wall as claimed in claim 1, wherein a pressing plate for pushing said base means is provided above said rolling ring.

3. A holding device with a securing sheet for mounting onto a wall, comprising:
   a) a base means in a shape of a circular plate and having a boundary;
   b) a holding means for supporting a foreign article, said holding means being connected with said base means;
   c) a securing sheet being air-tight, and having a back side and a front side; said securing sheet can be tightly secured onto a wall at said back side thereof and being connected to said base means at said front side thereof, and extending beyond said boundary of said base means;
   d) at least one friction plate in a shape of a ring located around said base means; said at least one friction plate being connected with said base means by ligaments provided on a periphery of said base means; said periphery of said base means and an inner periphery of said friction plate have inclined surfaces, respectively, which mate with each other, such that said friction plate presses against the wall and an upwardly statistic friction force is generated;
   wherein a pressing roller rotatable around said base means is provided on a front surface of said securing sheet, said pressing roller is in a shape of a roller and is provided at an axis center thereof with a shaft hole through which a shaft is disposed, one end of said shaft is big enough to prevent said pressing roller from detaching from said shaft and the other end is bent into a ring fitted with said base means.

4. The holding device with a securing sheet for mounting onto a wall as claimed in claim 3, wherein a rolling body of said pressing roller is formed into an appropriate taper, an axis of said pressing roller is canted with a radius of said base means.

5. A holding device with a securing sheet for mounting onto a wall, comprising:
   a) a base means in a shape of a circular plate and having a boundary;
   b) a holding means for supporting a foreign article, said holding means being connected with said base means;
   c) a securing sheet being air-tight, and having a back side and a front side; said securing sheet can be tightly secured onto the wall at said back side thereof and is connected to said base means at said front side thereof, and said securing sheet extends beyond said boundary of said base means;
   d) at least one friction plate, which is connected with said base means by detachable connecting rods, and said friction plate is located beyond a border of said securing sheet, such that said friction plate presses directly onto the wall and an upwardly statistic friction force is generated.

6. The holding device with a securing sheet for mounting onto a wall as claimed in claim 5, wherein an air barrier layer is provided on a surface of said securing sheet.

7. The holding device with a securing sheet for mounting onto a wall as claimed in claim 5, wherein a stripping piece extending upwards is provided on an edge of the front surface of said securing sheet.

8. The holding device with a securing sheet for mounting onto a wall as claimed in claim 5, wherein a rolling ring made of resilient material is provided around said base means, an inner periphery of said roiling ring bulges towards said securing sheet.

9. The holding device with a scouring sheet for mounting onto a wall as claimed in claim 8, wherein a pressing plate for pushing said base means is provided above said rolling ring.

10. A holding device with a securing sheet for mounting onto a wall, comprising:
  a) a base means in a shape of a circular plate and having a boundary;
  b) a holding means in a shape of a basket for supporting a foreign article, said holding means is connected with said base means;
  c) a securing sheet being air-tight, and having a back side and a front side; said securing sheet can be tightly secured onto a wall at said back side thereof and is connected to said base means at said front side thereof, and said securing sheet extends beyond said boundary of said base means;
  d) at least one friction plate fixed on a wall facing side of the basket shaped holding means, said friction plate is located below said securing sheet such that said friction plate presses directly onto the wall and an upwardly statistic friction force is generated;
  wherein a rolling ring made of resilient material is provided around said base means, an inner periphery of said rolling ring bulges towards said securing sheet.

11. The holding device with a securing sheet for mounting onto a wall as claimed in claim 10. wherein a pressing plate for pushing said base means is provided above said rolling ring.

12. A holding device with a securing sheet for mounting onto a wall, comprising:
  a) a base means in the shape of a plate and having a boundary;
  b) a holding means in the shape of a basket for supporting a foreign article, said holding means is connected with said base means;
  c) a securing sheet being air-tight, and having a back side, a front side, and a front surface; said securing sheet can be tightly secured onto a wall at said back side thereof and is connected to said base means at said front side thereof, and said securing sheet extends beyond said boundary of said base means;
  d) at least one friction plate fixed on a wall facing side of the basket shaped holding means, said friction plate is located below said securing sheet such that said friction plate presses directly onto the wall surface and an upwardly statistic friction force is generated;
  wherein a pressing roller rotatable around said base means is provided on said front surface of said securing sheet, said pressing roller is in the shape of a roller and is provided at an axis center thereof with a shaft hole through which a shaft is disposed, one end of said shaft is big enough to prevent the pressing roller from detaching from said shaft and the other end is bent into a ring fitted with said base means.

* * * * *